(12) United States Patent
Huang

(10) Patent No.: US 10,393,087 B2
(45) Date of Patent: Aug. 27, 2019

(54) FLUID DRIVEN TURBINE APPARATUS

(71) Applicant: Kuo-Chang Huang, Tainan (TW)

(72) Inventor: Kuo-Chang Huang, Tainan (TW)

(*) Notice: Subject to any disclaimer, the term of this patent is extended or adjusted under 35 U.S.C. 154(b) by 199 days.

(21) Appl. No.: 15/666,471

(22) Filed: Aug. 1, 2017

(65) Prior Publication Data

US 2018/0058417 A1    Mar. 1, 2018

(30) Foreign Application Priority Data

Aug. 23, 2016 (TW) .............................. 105126886 A

(51) Int. Cl.
| | | |
|---|---|---|
| *F03B 3/04* | (2006.01) | |
| *F03B 3/18* | (2006.01) | |
| *F03B 11/08* | (2006.01) | |
| *F03B 13/08* | (2006.01) | |

(52) U.S. Cl.
CPC .............. *F03B 3/186* (2013.01); *F03B 3/04* (2013.01); *F03B 11/08* (2013.01); *F03B 13/08* (2013.01); *F05B 2220/32* (2013.01); *F05B 2240/10* (2013.01); *F05B 2250/25* (2013.01); *Y02E 10/22* (2013.01); *Y02E 10/223* (2013.01); *Y02E 10/226* (2013.01)

(58) Field of Classification Search
CPC .... F03B 3/186; F03B 3/16; F03B 3/18; F03B 3/12; F03B 3/04; F03B 3/123; F03B 13/268

USPC ........................................................ 415/208.2
See application file for complete search history.

(56) References Cited

U.S. PATENT DOCUMENTS

| | | | | |
|---|---|---|---|---|
| 2,778,563 A | * | 1/1957 | Doyle ....................... | A47L 5/22 |
| | | | | 15/327.1 |
| 4,382,746 A | * | 5/1983 | Retz ......................... | F03B 1/02 |
| | | | | 415/202 |
| 8,461,705 B2 | * | 6/2013 | Kuroishi .................. | F03B 3/00 |
| | | | | 290/43 |
| 8,461,712 B1 | * | 6/2013 | Lyatkher ................. | F03B 3/186 |
| | | | | 290/54 |

* cited by examiner

*Primary Examiner* — Justin D Seabe
*Assistant Examiner* — Jason Mikus
(74) *Attorney, Agent, or Firm* — Lewis Roca Rothgerber Christie LLP

(57) ABSTRACT

A fluid driven turbine apparatus includes a hollow body and rib plates annularly disposed in the hollow body. A vane module is disposed in the hollow body and co-axially connected to a shaft extending axially through the hollow body. The rib plates surround the vane module and are spaced apart from the vane module by an annular gap. The annular gap has a width gradually enlarged in a top-to-bottom direction. When fluid flows into the vane module and is diverted sideward to the annular gap, large sand grains carried by fluid may pass through an enlarged lower portion of the annular gap without getting stuck therein and abrading the rib plates and the vane module.

8 Claims, 6 Drawing Sheets

FLUID DRIVEN TURBINE APPARATUS

CROSS-REFERENCE TO RELATED APPLICATION

This application claims priority to Taiwanese Patent Application No. 105126886, filed on Aug. 23, 2016.

FIELD

The disclosure relates to a turbine apparatus, and more particularly to a fluid driven turbine apparatus for hydroelectric power generation.

BACKGROUND

A fluid driven turbine apparatus disclosed in Taiwanese Utility Model Patent No. M526625 is suitable for a hydroelectric power generation system. The fluid driven turbine apparatus includes an outer hollow member and a rotation unit disposed within the outer hollow member. The rotation unit includes a plurality of sideward flow passages extending radially and sideward from a center of the rotation unit. When water flows to the rotation unit and passes through the sideward flow passages to hit the outer hollow member, the rotation unit is driven to rotate for hydroelectric power generation. When large sand grains carried by the water pass through a gap formed between the rotation unit and the outer hollow member, they may abrade the rotation unit and the hollow member. To reduce abrasion caused to the fluid driven turbine apparatus, generally, introduction of large sand grains is avoided by disposing the fluid driven turbine apparatus in high water level region of a reservoir where the content of sands is low. However, water levels in some reservoirs are low and sand contents therein are high. Therefore, improvements over the existing fluid driven turbines are still necessary.

SUMMARY

Therefore, an object of the disclosure is to provide a fluid driven turbine apparatus that is suitable for use in a low-water level region or high sand content region of a reservoir.

According to the disclosure, a fluid driven turbine apparatus includes an outer hollow member and a rotation unit.

The outer hollow member includes a hollow body, a plurality of rib plates and an installation space. The hollow body has an axis extending in a top-bottom direction. The rib plates are disposed in the top-bottom direction and connected to an inner surface of the hollow body in an angularly spaced apart manner around the axis of the hollow body. Each of the rib plates has a plate end distal from the inner surface of the hollow body. The installation space is surrounded by the plate ends of the rib plates.

The rotation unit includes a shaft and a vane module. The shaft extends in the top-bottom direction through the installation space. The vane module is rotatably disposed in the installation space and co-axially connected to the shaft. The vane module is configured to be driven by fluid flowing through the hollow body to rotate together with the shaft along an operating direction. The vane module is spaced apart from the plate ends of the rib plates by an annular gap. The annular gap has a width gradually enlarged in the top-to-bottom direction. The vane module has a middle flow-guiding channel opening upward and surrounding the shaft, and a plurality of angularly spaced apart sideward flow passages extending from the middle flow-guiding channel to the annular gap. Each of the sideward flow passages extends curvedly in a direction opposite to the operating direction.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
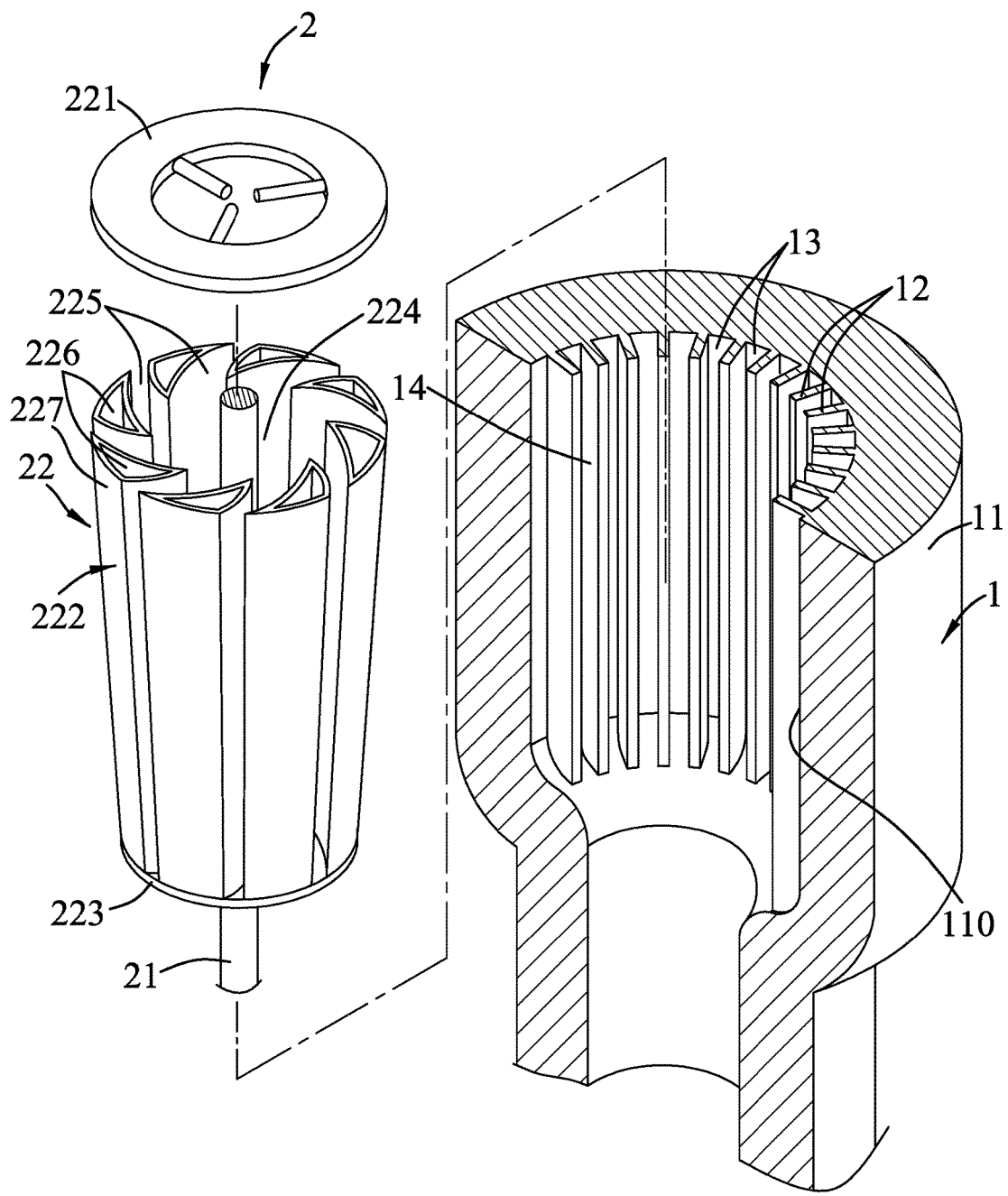
FIG. 1 is an exploded and partly sectioned view of a fluid driven turbine apparatus according to a first embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
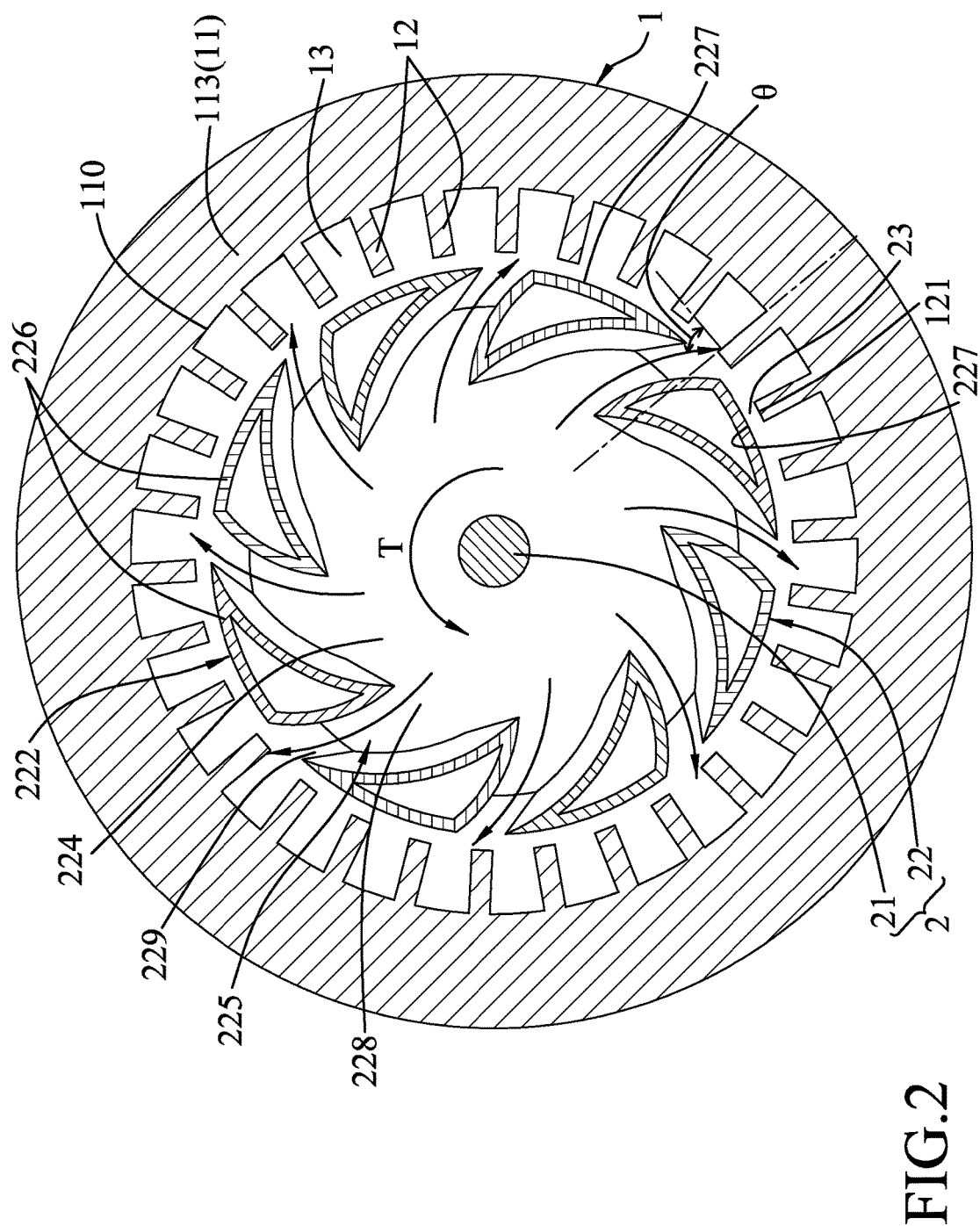
FIG. 2 is a top sectioned view of the first embodiment.
Figure 3:
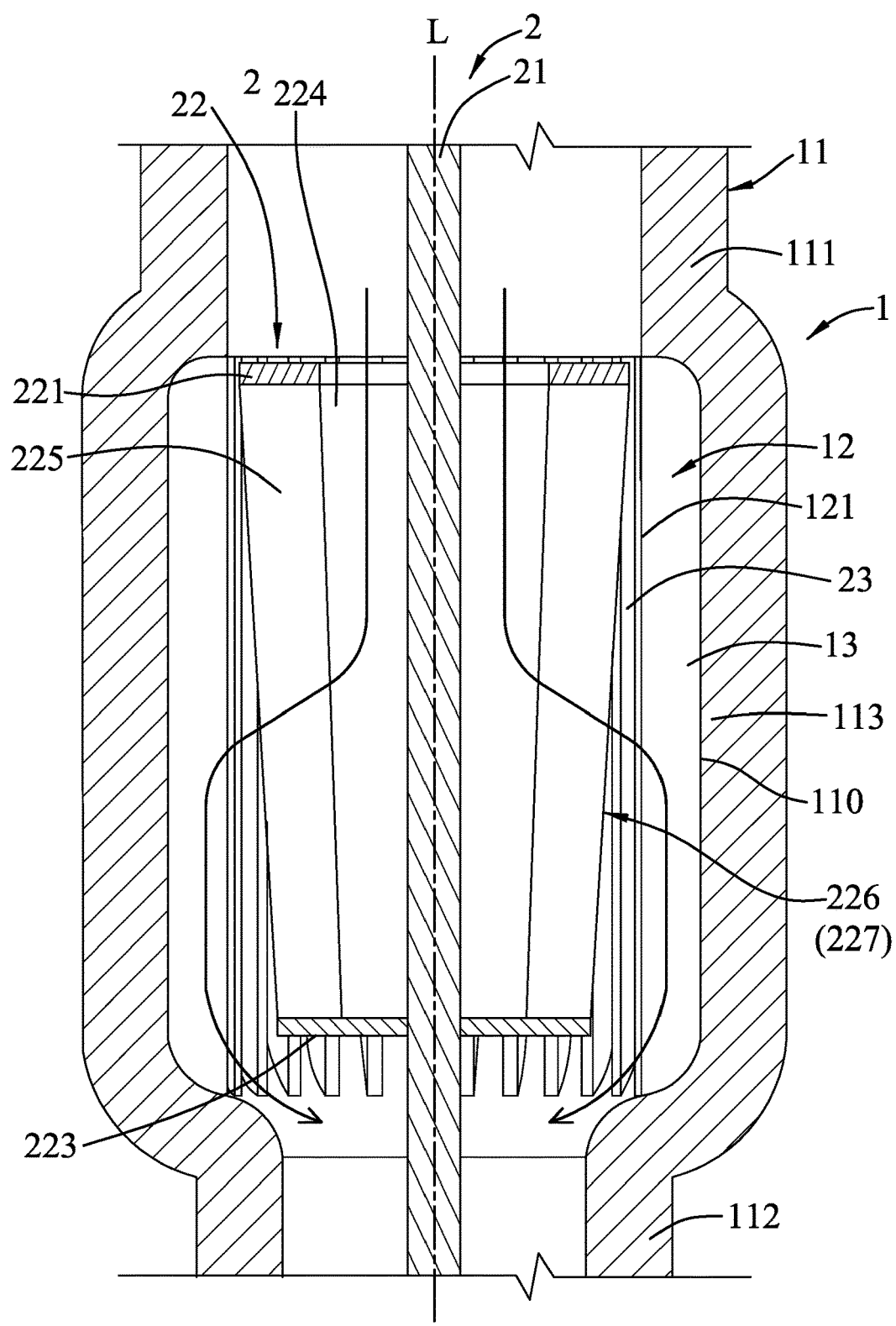
FIG. 3 is a fragmentary sectional side view of the first embodiment.

Referring to FIGS. 1 to 3, a fluid driven turbine apparatus according to a first embodiment of the present disclosure includes an outer hollow member 1 and a rotation unit 2.

The outer hollow member 1 includes a hollow body 11, a plurality of rib plates 12 and an installation space 14. The hollow body 11 is configured to allow fluid to flow in a top-bottom direction therethrough and has an axis (L) extending in the top-bottom direction. The hollow body 11 has an upper tubular portion 111, a lower tubular portion 112, and an expanded portion 113 connected between and having a larger inner cross section than that of the upper and lower tubular portions 111, 112. In this embodiment, the inner cross section of the lower tubular portion 112 is smaller than that of the upper tubular portion 111, so that a flow speed at the lower tubular portion 112 is greater than a flow speed at the upper tubular portion 111.

The rib plates 12 are disposed in the top-bottom direction within the expanded portion 113 and is connected to an inner surface 110 of the hollow body 11 in an angularly spaced apart manner around the axis (L) of the hollow body 11. The rib plates 12 extend inwardly from the inner surface 110 to the axis (L) of the hollow body 11. Two adjacent ones of the rib plates 12 cooperatively define a rib passage 13 that extends in the top-bottom direction. Each rib plate 12 has a plate end 121 distal from the inner surface 110 and extending between the upper and lower tubular portion 111, 112 in the top-bottom direction. The installation space 14 is surrounded by the plate ends 121 of the rib plates 12.

The rotation unit includes a shaft 21 extending in the top-bottom direction through the installation space 14, and a vane module 22 rotatably disposed in the installation space 14 and co-axially connected to the shaft 21. The vane module 22 is spaced apart from the plate ends 121 of the rib plates 12 by an annular gap 23. The annular gap 23 has a width gradually enlarged in a top-to-bottom direction. The vane module 22 is configured to be driven by the fluid flowing through the hollow body 11 to rotate together with the shaft 21 along an operating direction (T). The vane module 22 includes an annular top plate 221 sleeved on the shaft 21, a middle flow-guiding channel 224 opening upward and toward the upper tubular portion 111 and surrounding the shaft 21, a vane unit 222 tapered downwardly from the annular top plate 221 and surrounding the middle flow-guiding channel 224, a plurality of angularly spaced apart sideward flow passages 225 extending sideward from the middle annular flow-guiding channel 224 to the annular gap 23 through the vane unit 222, and a bottom closing plate 223 connected to a bottom of the vane unit 222.

The annular top plate 221 is a circular ring defining an opening of the middle flow-guiding channel 224. The vane unit 222 includes a plurality of vanes 226 angularly spaced apart from each other and disposed around the shaft 21. Each vane 226 has an outer surface 227 facing the annular gap 23. The outer surface 227 is gradually inclined inward and toward the shaft 21 from the annular top plate 221 to the bottom closing plate 223. In this embodiment, each vane 226 is hollow. Therefore, an entire weight of the rotation unit 2 can be reduced. A density of the vane unit 222 approaches 1 so that the vane module 22 can rotate in an energy saving manner. The bottom closing plate 223 is a circular plate closing bottoms of the middle flow-guiding channel 224 and the sideward flow passages 225. Every two adjacent vanes 226 cooperatively define one of the sideward flow passages 225. Each sideward flow passage 225 extends curvedly in a direction opposite to the operating direction (T). Each sideward flow passage 225 has an inlet 228 communicating the middle flow-guiding channel 224, and an outlet 229 distal from the inlet 228 to allow the fluid to flow out therethrough.

Figure 4:
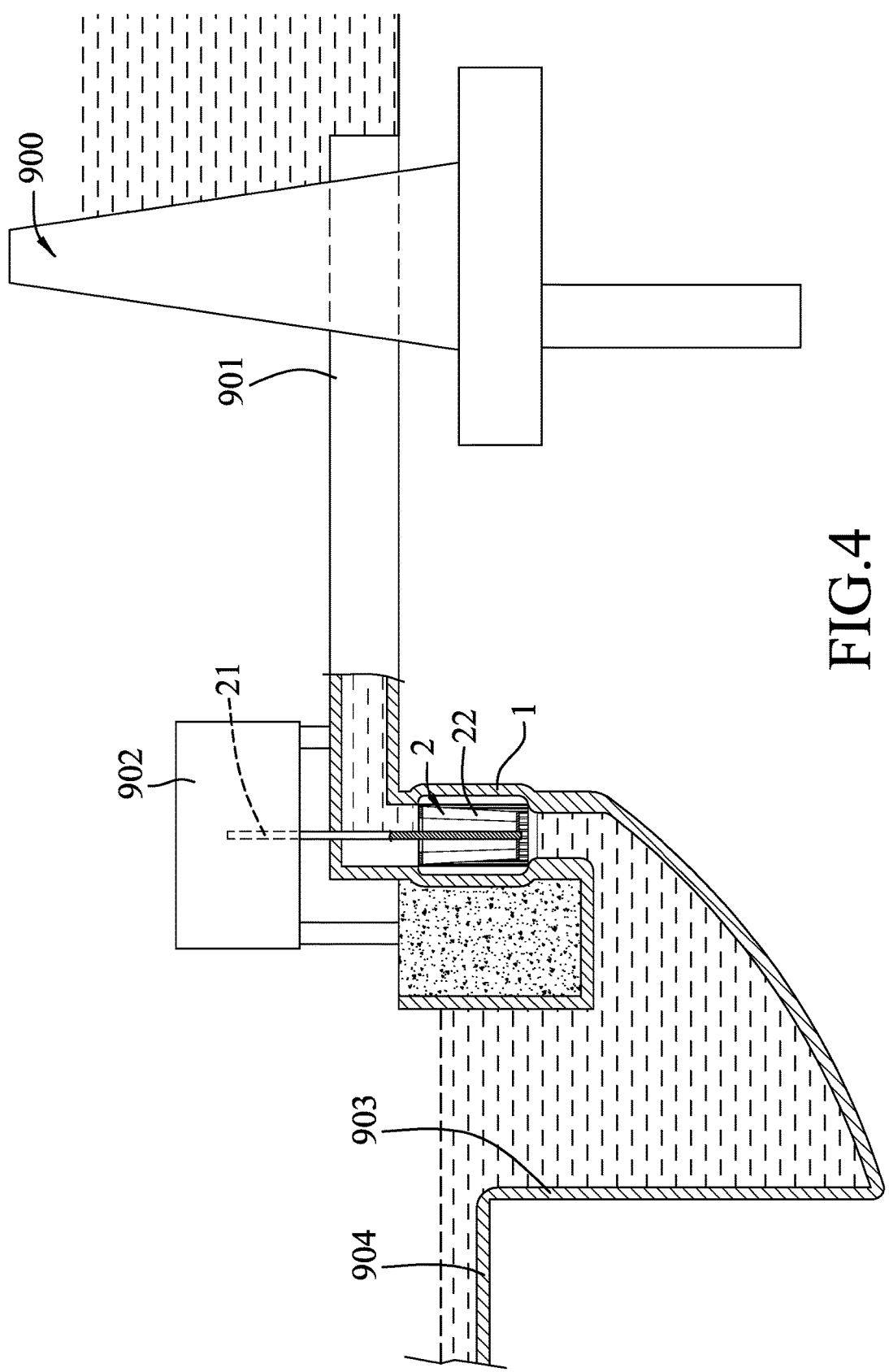
FIG. 4 illustrates the fluid driven turbine apparatus of the first embodiment installed near a reservoir.
Figure 5:
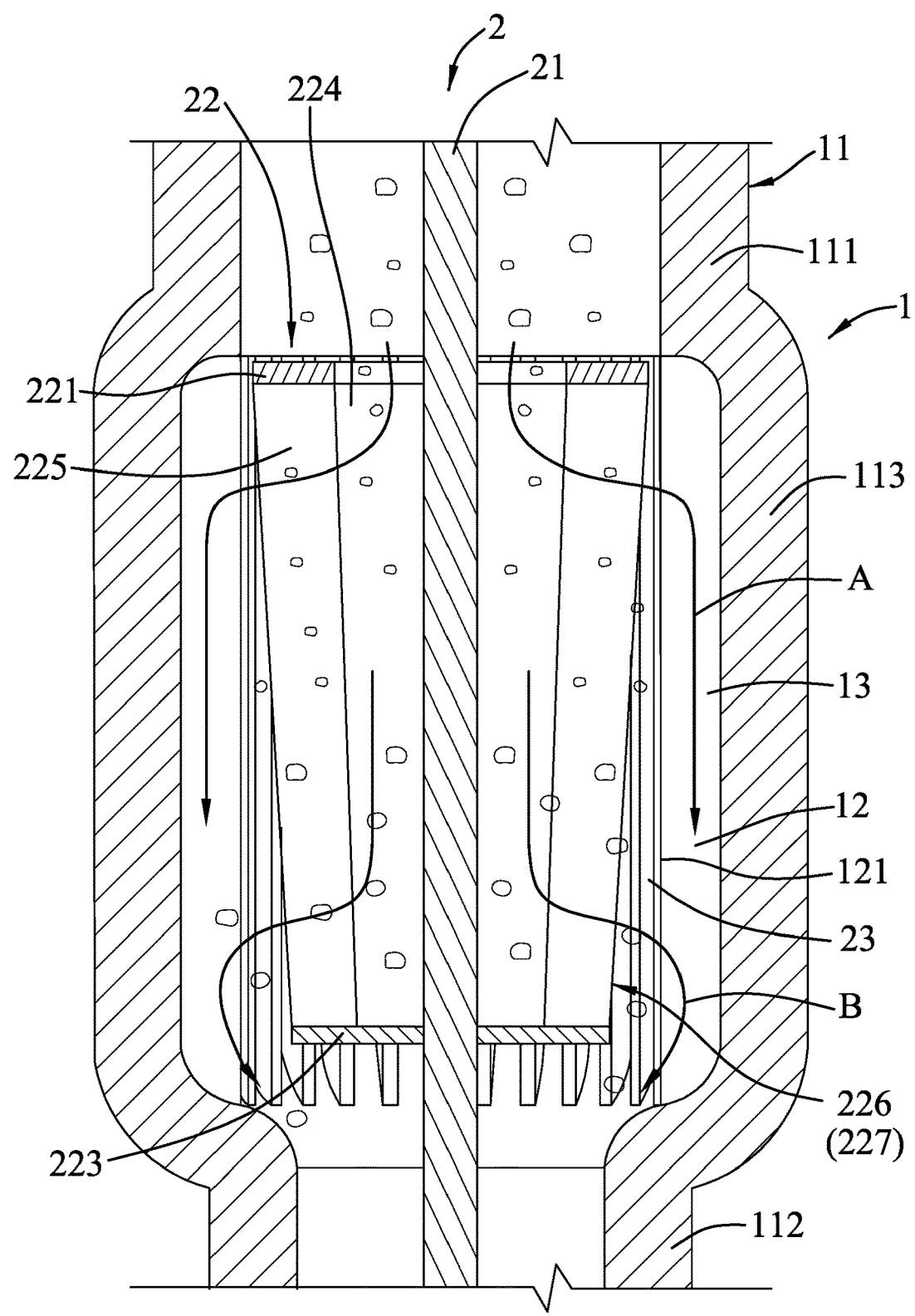
FIG. 5 illustrates how large and small sand grains are distributed and flow in an outer hollow body during the rotation of a vane module of the fluid driven turbine apparatus of the first embodiment.

Referring to FIGS. 4 and 5, in combination with FIG. 2, the fluid driven turbine apparatus of the present disclosure is located near a low-water level region or a high sand content region of a reservoir 900. A water-guiding pipe 901 is used to convey fluid from the reservoir 900 to the outer hollow member 1 in the top-to-bottom direction. A power generator 902 is connected to the shaft 21 and converts the rotational kinetic energy of the shaft 21 into an electric energy. The fluid passing through the fluid driven turbine apparatus of the present disclosure flows into a tail water pond 903, overflows to an outflow channel 904 from the tail water pond 903, and returns to the reservoir at a downstream site. Sand grains carried by the fluid are accumulated in the tail water pond 903 and may be removed using sediment removing machines. In addition, a trash rack (not shown) may be disposed at an inlet of the water-guiding pipe 901 to prevent rocks, tree branches or garbage from entering the water-guiding pipe 901.

When the fluid flows to the vane module 22, the annular top plate 221 guides the fluid to flow into the middle flow-guiding channel 224, and the bottom closing plate 223 diverts the fluid to the sideward flow passages 225. In this embodiment, each of the vanes 226 extends linearly in the top-bottom direction. When the fluid flows through the sideward flow passages 225, the vanes 226 guide the fluid to exit the sideward flow passages 225, and the fluid pushes the vanes 226, thereby generating a torque to drive rotation of the vane module together with the shaft 21 along the operating direction (T). In addition, when the fluid exits the sideward flow passages 225, the fluid hits the rib plates 12 at an angle (θ) (see FIG. 2), and the resulting counteracting force is transferred to the vanes 226 from the fluid, causing the vanes 226 to rotate in the operating direction (T). The torque applied to the vane module 22 is thus increased. In this embodiment, the angle (θ) ranges between 0 degrees and 90 degrees.

Because the water level of in the reservoir 900 is low, large sand grains in the reservoir 900 are easily carried by the fluid through the water-guiding pipe 901 to the fluid driven turbine apparatus of the present disclosure. As shown in FIG. 5, when the fluid exiting from the sideward flow passages 225 flows into the rib passages 13 during the rotation of the vane module 22, small and large sand grains are carried by the fluid to the annular gap 23. Because gravitational and momentum forces of small sand grains are small, the small sand grains move in a direction (A) and reach an upper portion of the annular gap 23 from an upper portion of the middle flow-guiding channel 224. Because gravitational and momentum forces of the large sand grains are large, the large sand grains move in a direction (B) and reach a lower portion the annular gap 23 from a lower portion of the middle flow-guiding channel 224.

Since the annular gap 23 is gradually widened in the top-to-bottom direction, the width of the lower portion of the annular gap 23 is large so that large sand grains will not be stuck in the enlarged lower portion of the annular gap 23, thereby avoiding abrasion caused to the vane module 22 and the plate ends 121 of the rib plates 12. By virtue of the design of the annular gap 23 that is widened from top to bottom to match with the size distribution of small and large sand grains, the sand grains may be prevented from abrading the vane module 22 and the rib plates 12. Therefore, the fluid driven turbine apparatus according to the present disclosure may be used at a reservoir having low water level or high sand content.

Figure 6:
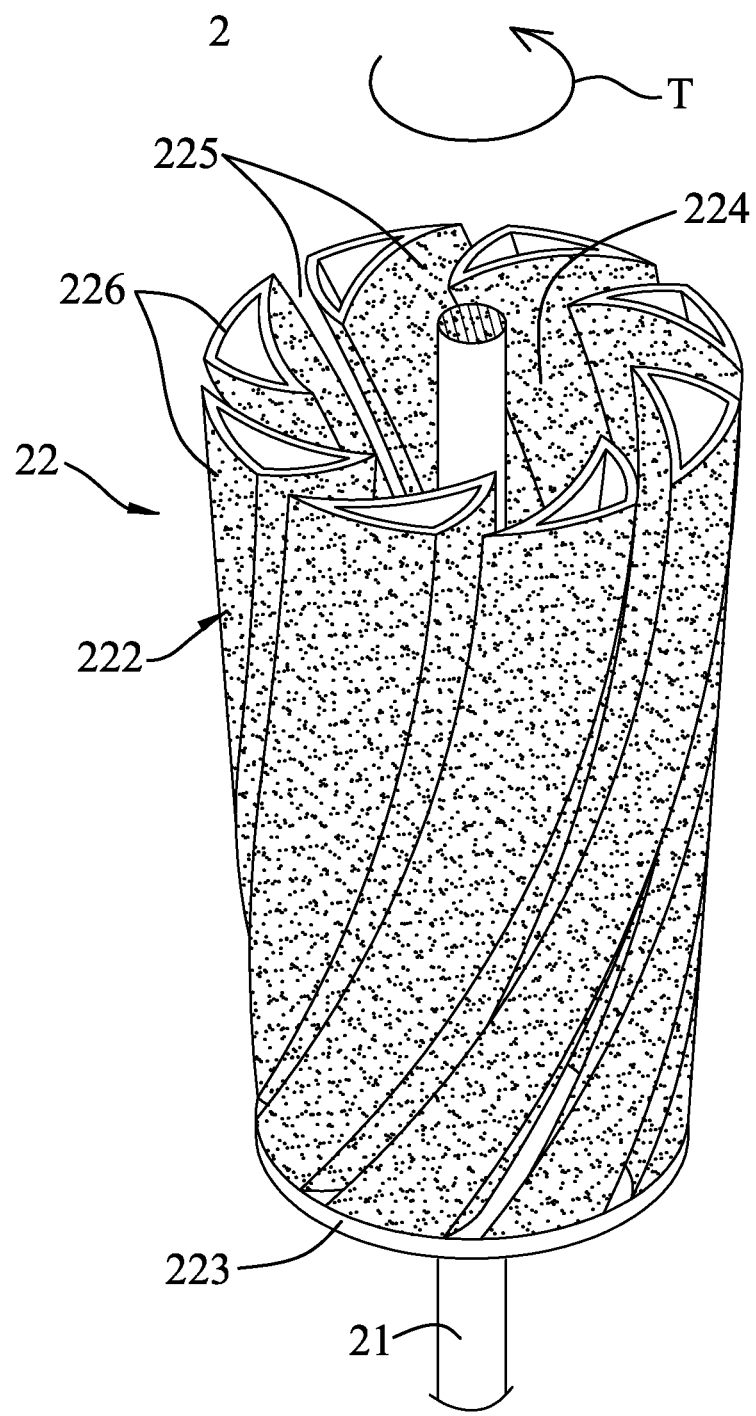
FIG. 6 is a perspective view, illustrating a vane module and a shaft of a fluid driven turbine apparatus according to a second embodiment of the present disclosure.

Referring to FIG. 6, in a second embodiment of a fluid driven turbine apparatus according to the present disclosure, each vane 226 extends helically in the top-to-bottom direction and is curved oppositely from the operating direction (T). In addition, each vane 226 has a rough outer surface.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A fluid driven turbine apparatus comprising:
an outer hollow member including
a hollow body having an axis extending in a top-bottom direction,
a plurality of rib plates which are disposed in the top-bottom direction and connected to an inner surface of said hollow body in an angularly spaced apart manner around the axis of said hollow body, and each of which has a plate end distal from said inner surface of said hollow body, and an installation space surrounded by said plate ends of said rib plates; and a rotation unit including a shaft extending in the top-bottom direction through said installation space, and a vane module rotatably disposed in said installation space and co-axially connected to said shaft, said vane module being configured to be driven by fluid flowing through said hollow body to rotate together with said shaft along an operating direction, said vane module being spaced apart from said plate ends of said rib plates by an annular gap, said annular gap having a width gradually enlarged in a top-to-bottom direction, said vane module having a middle flow-guiding channel opening upward and surrounding said shaft, and a plurality of angularly spaced apart sideward flow passages extending from said middle flow-guiding channel to said annular gap, each of said sideward flow passages extending curvedly in a direction opposite to the operating direction.

2. The fluid driven turbine apparatus as claimed in claim 1, wherein said vane module includes an annular top plate sleeved on said shaft, a vane unit tapered downwardly from said annular top plate and surrounding said middle flow-guiding channel, and a bottom closing plate connected to a bottom of said vane unit and closing bottoms of said middle flow-guiding channel and said sideward flow passages, each of said sideward flow passages extending sideward to said annular gap from said middle flow-guiding channel through said vane unit.

3. The fluid driven turbine apparatus as claimed in claim 2, wherein said vane unit includes a plurality of vanes angularly spaced apart from each other and disposed around said shaft, every two adjacent ones of said vanes cooperatively defining one of said sideward flow passages, each of said vanes having an outer surface facing said annular gap and being gradually inclined inward and toward said shaft from said annular top plate to said bottom closing plate.

4. The fluid driven turbine apparatus as claimed in claim 1, wherein said hollow body has an upper tubular portion, a lower tubular portion, and an expanded portion connected between and having a larger inner cross section than that of said upper and lower tubular portions, said rib plates being disposed in said expanded portion, two adjacent ones of said rib plates cooperatively defining a rib passage that extends in the top-bottom direction, and wherein the fluid exiting from said sideward flow passages flows into said rib passages defined by said rib plates.

5. The fluid driven turbine apparatus as claimed in claim 1, wherein each of said sideward flow passages has an inlet communicating said middle flow-guiding channel, and an outlet distal from said inlet to allow the fluid to flow out therethrough.

6. The fluid driven turbine apparatus as claimed in claim 3, wherein each of said vanes has a rough outer surface.

7. The fluid driven turbine apparatus as claimed in claim 3, wherein each of said vanes extends linearly in the top-to-bottom direction.

8. The fluid driven turbine apparatus as claimed in claim 3, wherein each of said vanes extends helically in the top-bottom direction and is curved oppositely from the operating direction.

* * * * *